Nov. 5, 1929.　　　　F. EBERHART　　　　1,734,290
CAN SPRAYING MACHINE
Filed April 22, 1922　　9 Sheets-Sheet 4

Inventor:
Felix Eberhart
By: Munday, Clarke & Carpenter
Attys.

Nov. 5, 1929.  F. EBERHART  1,734,290
CAN SPRAYING MACHINE
Filed April 22, 1922   9 Sheets-Sheet 6

Nov. 5, 1929.  F. EBERHART  1,734,290
CAN SPRAYING MACHINE
Filed April 22, 1922  9 Sheets-Sheet 7

Nov. 5, 1929.  F. EBERHART  1,734,290
CAN SPRAYING MACHINE
Filed April 22, 1922    9 Sheets-Sheet 8

Inventor:
Felix Eberhart
By: Munday, Clarke & Carpenter
Attys

Nov. 5, 1929.  F. EBERHART  1,734,290
CAN SPRAYING MACHINE
Filed April 22, 1922   9 Sheets-Sheet 9

Patented Nov. 5, 1929

1,734,290

UNITED STATES PATENT OFFICE

FELIX EBERHART, OF NEWARK, NEW JERSEY, ASSIGNOR TO AMERICAN CAN COMPANY, OF NEW YORK, N. Y., A CORPORATION OF NEW JERSEY

CAN-SPRAYING MACHINE

Application filed April 22, 1922. Serial No. 555,976.

This invention relates in general to spraying machines, and has more particular reference to such machines for spraying the inner surface of cans with lacquer or other liquid material.

A principal object of the invention is the provision of spraying devices adapted to direct the spray over the entire inner surface of a can, having for this purpose a movable mounting adapted to assume different positions to dispose the spraying device at different angles with respect to the can.

Another object of the invention is the provision of spray controlling means automatically operated by parts associated with the movable elements employed to shift the position of said spraying devices.

It is also an object of the invention to provide means whereby said spray controlling means is prevented from functioning in the absence of a can in position to receive the spray.

The invention also contemplates an arrangement of the can feeding mechanism in such manner that it is accurately co-related with the can spraying action, so that the cans receive an exact amount of spray and are handled with exceptional speed and efficiency.

A still further object of the invention is the provision of apparatus of this character in which a double set of spraying devices is employed and both devices operated by the same actuating and controlling mechanism.

Other objects and advantages of the invention will be apparent as it is better understood from the following description, which, taken in connection with the accompanying drawings, discloses a preferred embodiment thereof.

Referring to the drawings.

The machine in which my invention is embodied comprises a double set of alternately acting spraying devices mounted upon a supporting frame 11. At each end of this frame are vertical can guides 12 and 13 through which the cans pass to turrets 14 which are provided with pockets 15 to receive the cans from the gravity chutes. The turrets or pocket wheels 14 are intermittently rotated by means of connecting rods 16 which are actuated by gears 17 mounted upon a cross shaft 18, said rods being secured to eccentric portions of said gears as indicated at 17'. This shaft is driven from a motor 19 through gearing comprising a pinion 21 keyed to the motor shaft 22 and driving a gear 23 carried on a counter shaft 24 which also has mounted thereon a pinion 25 meshing with a gear 26 which is secured to a second counter shaft 27 carrying also a pinion 28 engaging a large gear 29 upon the shaft 18.

The pocket wheels 14 are mounted on shafts 31 which have bearings 32 in upper frame parts 33 and carry at their outer ends ratchets 34. These ratchets are rotated intermittently by means of pawls 35 which are connected by arms 36 with pins 37 with which the connecting rods 16 are loosely connected, and these connecting rods are connected by means of arms 38 with the shafts 31 upon which the ratchets 34 are carried. Each downward movement of the rods 16 produces a quarter turn of the ratchets 34, this being effected by the pawls 35 engaging in notches 39 in the peripheries of said ratchets. Upon reaching the end of the downward stroke, the pawls 35 are disengaged from the notches 39, and at this time pawls 41 engage in the uppermost notches 39 to lock the ratchets in position. Upon the upward stroke of the connecting rods the pawls 35 ride upon the faces of the ratchets until they reach the next notch at which time the pawls 41 are disengaged by projections 42 carried on the pin 37, and the ratchets are ready for the next quarter turn.

Figure 1:
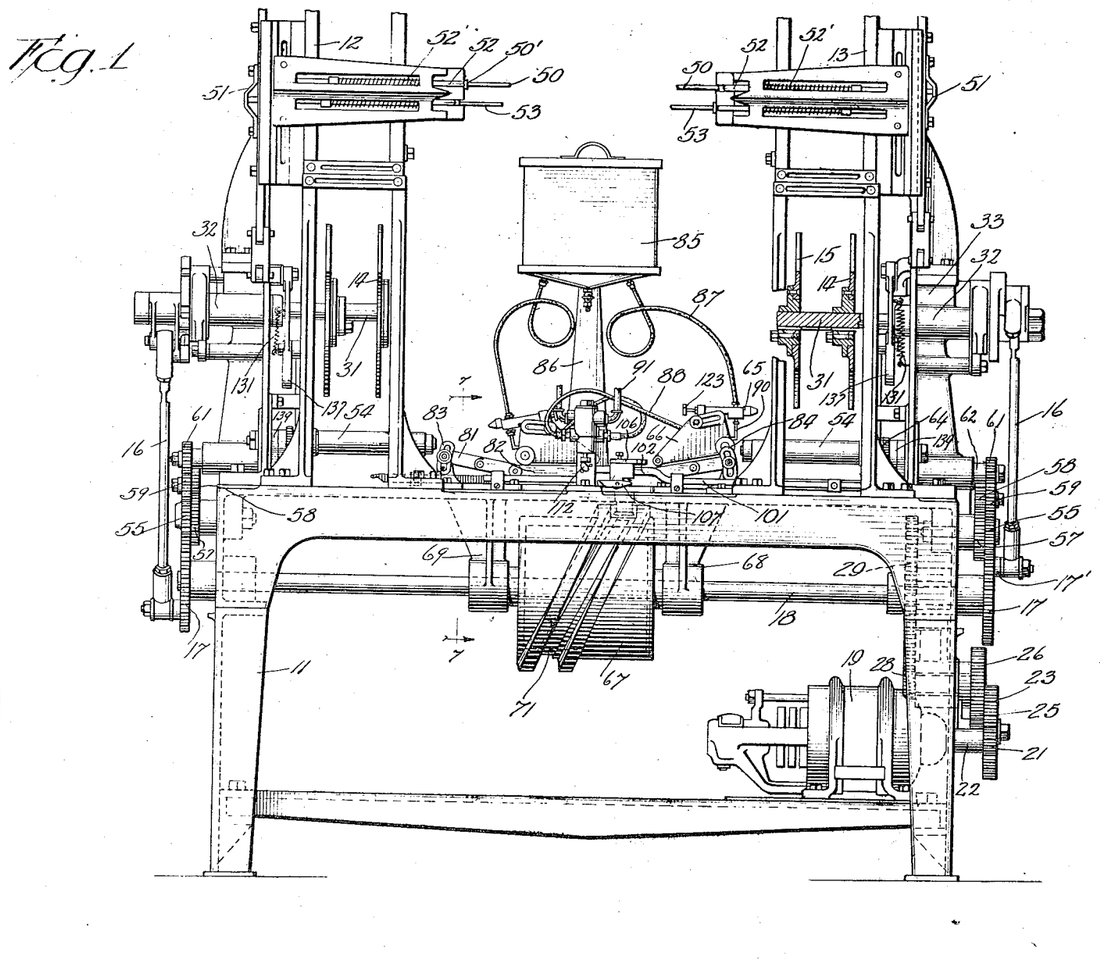
Figure 1 is a side elevation of a machine in which my invention is embodied.
Figure 2:
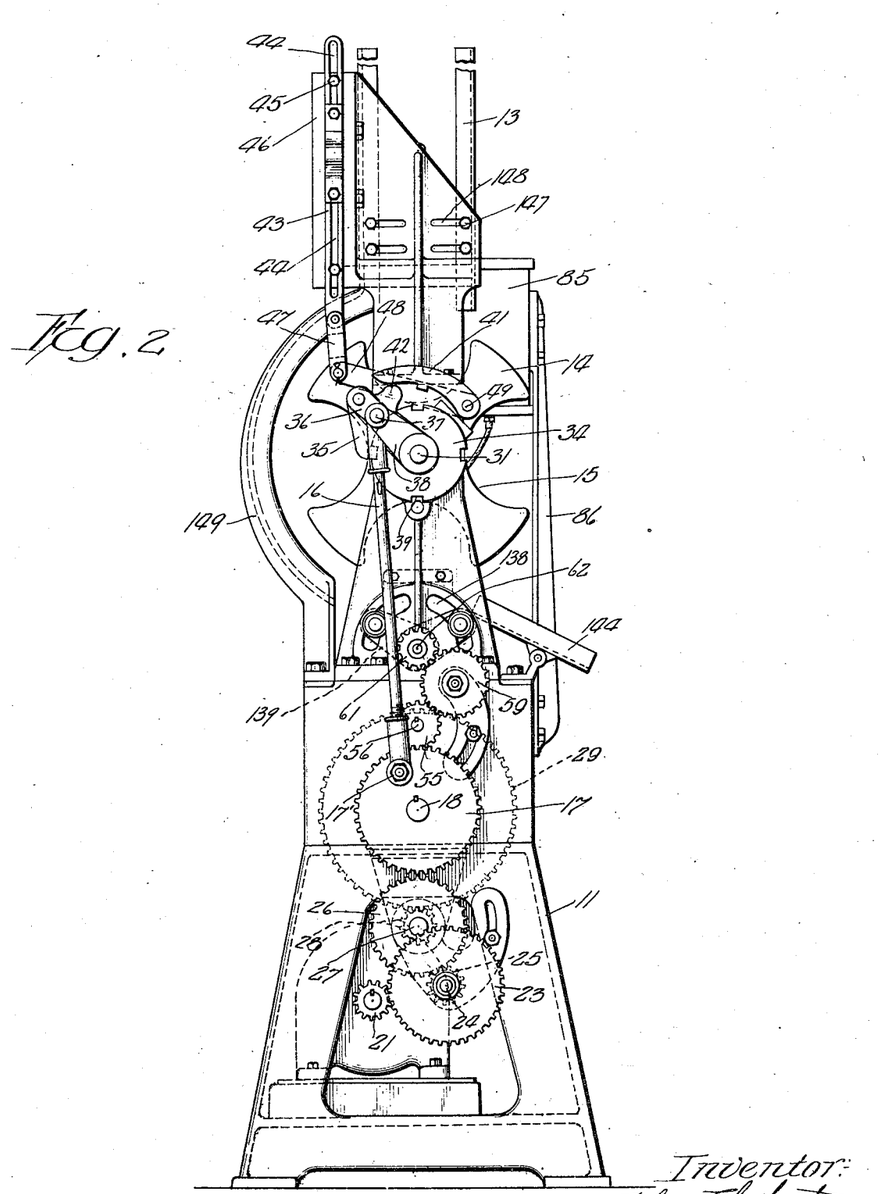
Fig. 2 is an end elevation thereof looking toward the left in Fig. 1.
Figure 3:
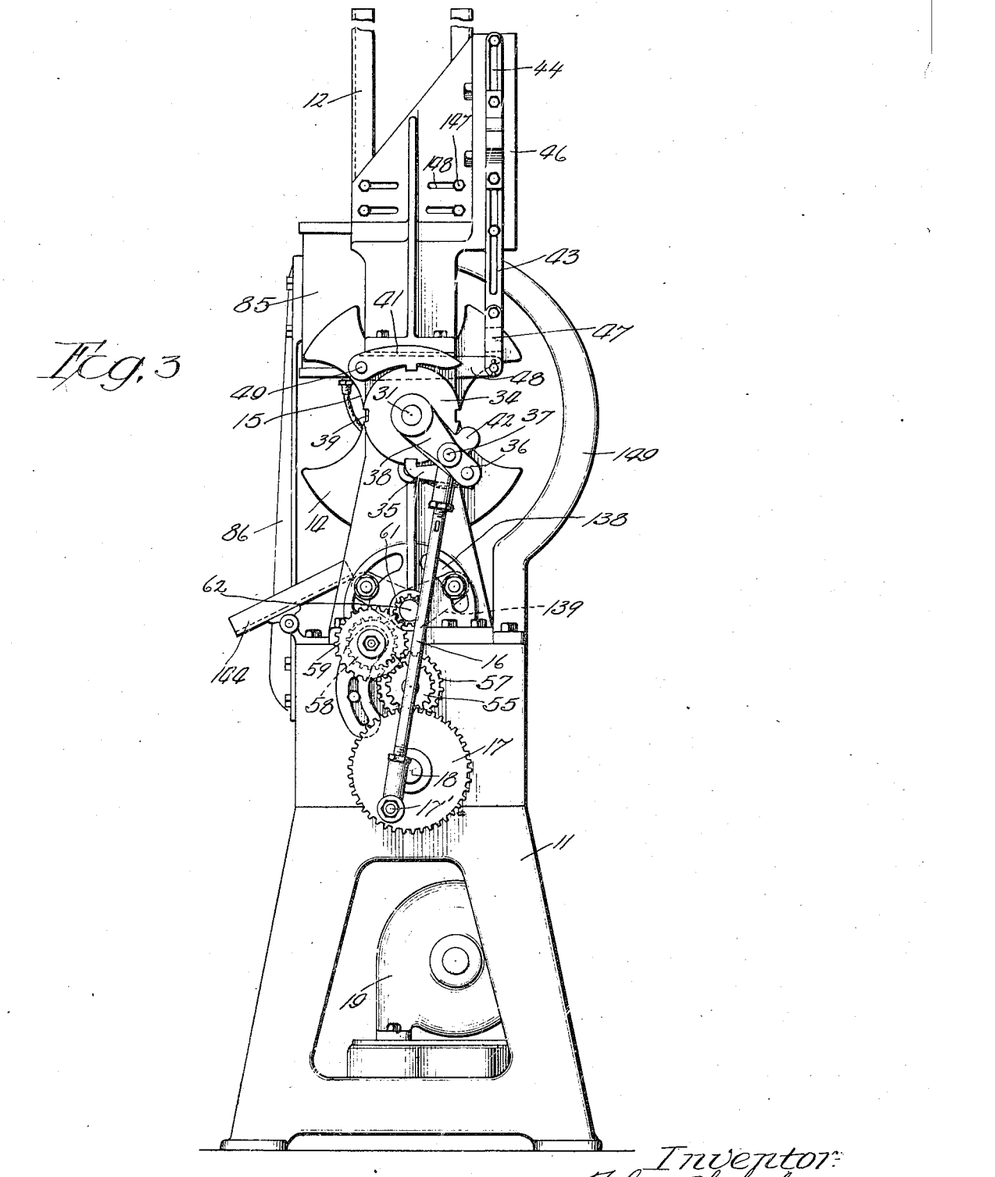
Fig. 3 is an end elevation looking toward the right in Fig. 1.
Figure 4:
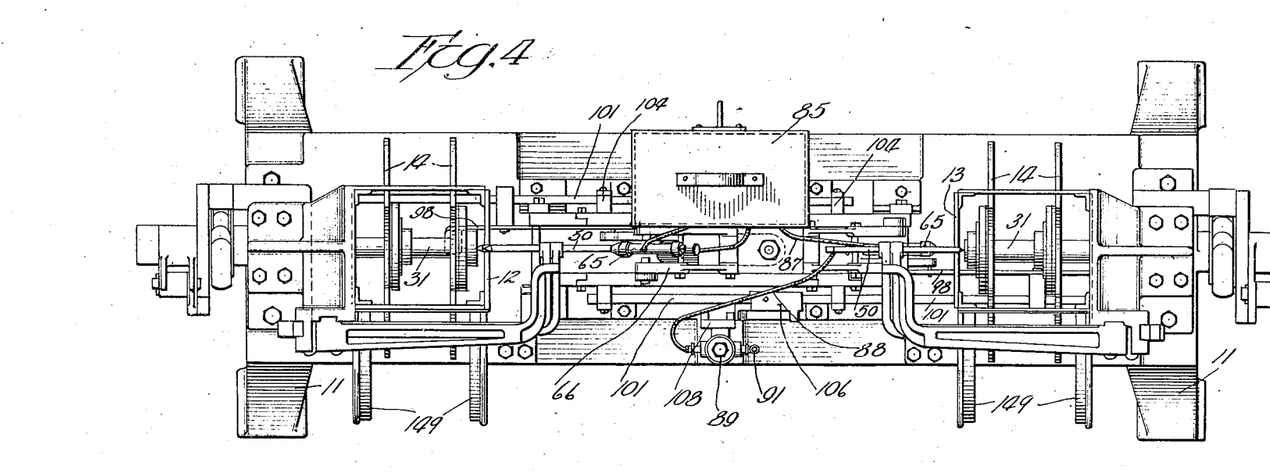
Fig. 4 is a top plan view of the machine.
Figure 5:
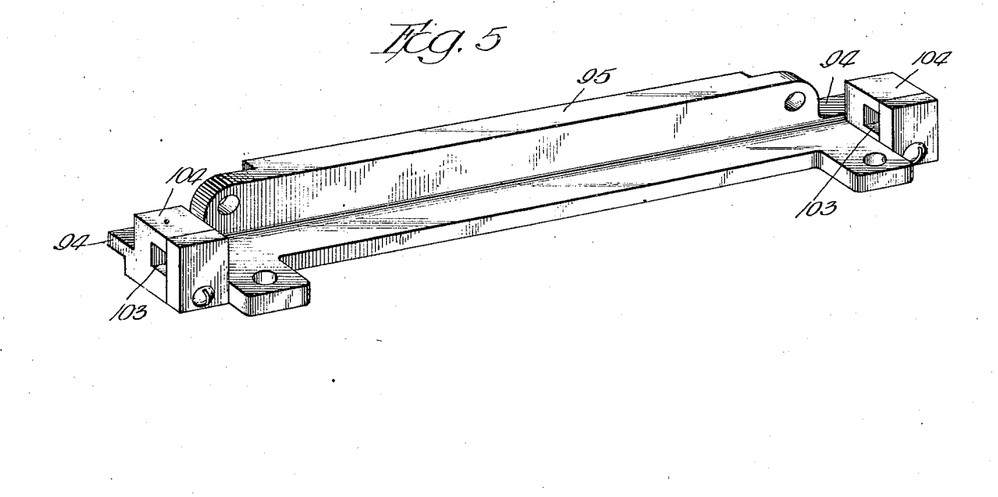
Fig. 5 is an enlarged detail view of the guide member employed upon the bed of the machine.

The cans are fed to the turrets or pocket wheels 14 individually by means of controlling mechanism illustrated in Figs. 2 and 3. This mechanism comprises a slide 43 provided with slots 44 through which extend bolts 45 projecting from brackets 46 on the upper frame of the machine. The slides 43 are connected by links 47 with arms 48 which are pivotally mounted on pins 49 which also carry the pawls 41. Secured to the slides 43 are cams 51 (Fig. 1) which on their downward stroke push out rods 52 against the pressure of springs 52′, thereby forcing outwardly pins 50, which are carried in collars 50′ on inwardly turned ends of the rods 52, and releasing a can in the guideways 12 and 13. The can is held, however, from dropping into the pocket wheels by pins 53 which are pushed out on the upward stroke of the cams 51, it being noted, however, at this time the pins 50 are retracted to catch the next can as it falls, and in this manner only one can at a time is permitted to enter the turrets 14. At each quarter turn said turrets deliver a can onto rollers 54 arranged in pairs in the lower part of the upper frames 33.

These rollers are rotated by means of gearing transmitting power from the shaft 18. This gearing comprises pinions 55 meshing with the gears 17, said pinions being carried on shafts 56 to which are secured gears 57 meshing with pinions 58 formed integrally with gears 59 which drive pinions 61 mounted on roller driving shafts 62. Upon the inner end of the shaft 62 is a gear 63 which meshes with pinions 64 which are secured to the inner ends of the rollers 54. By this mechanism the rollers 54 are constantly rotated in the same direction and serve to rotate the cans in spray receiving position.

Figure 8:
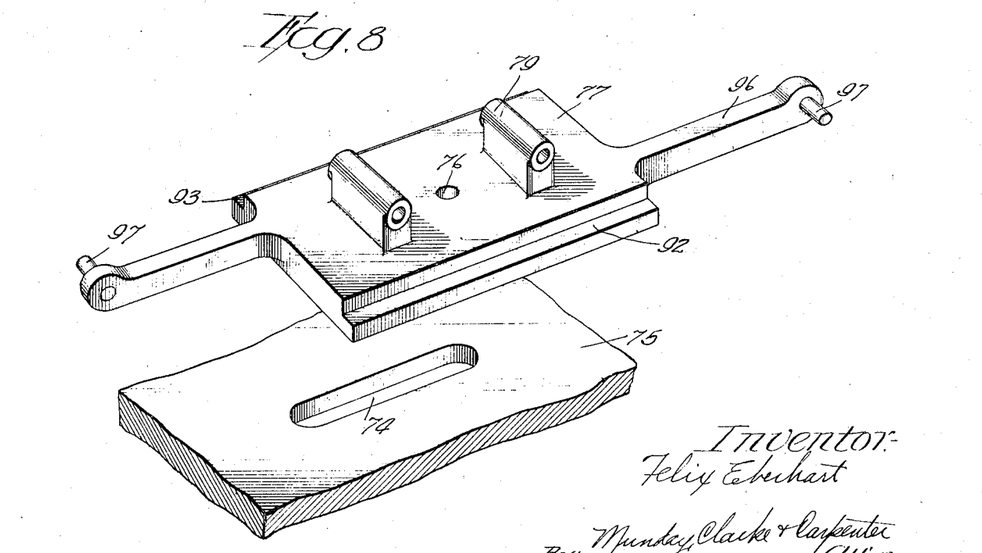
Fig. 8 is an enlarged perspective of the slide employed to control the spraying devices and showing a portion of the bed upon which it is mounted.
Figures 9, 10:
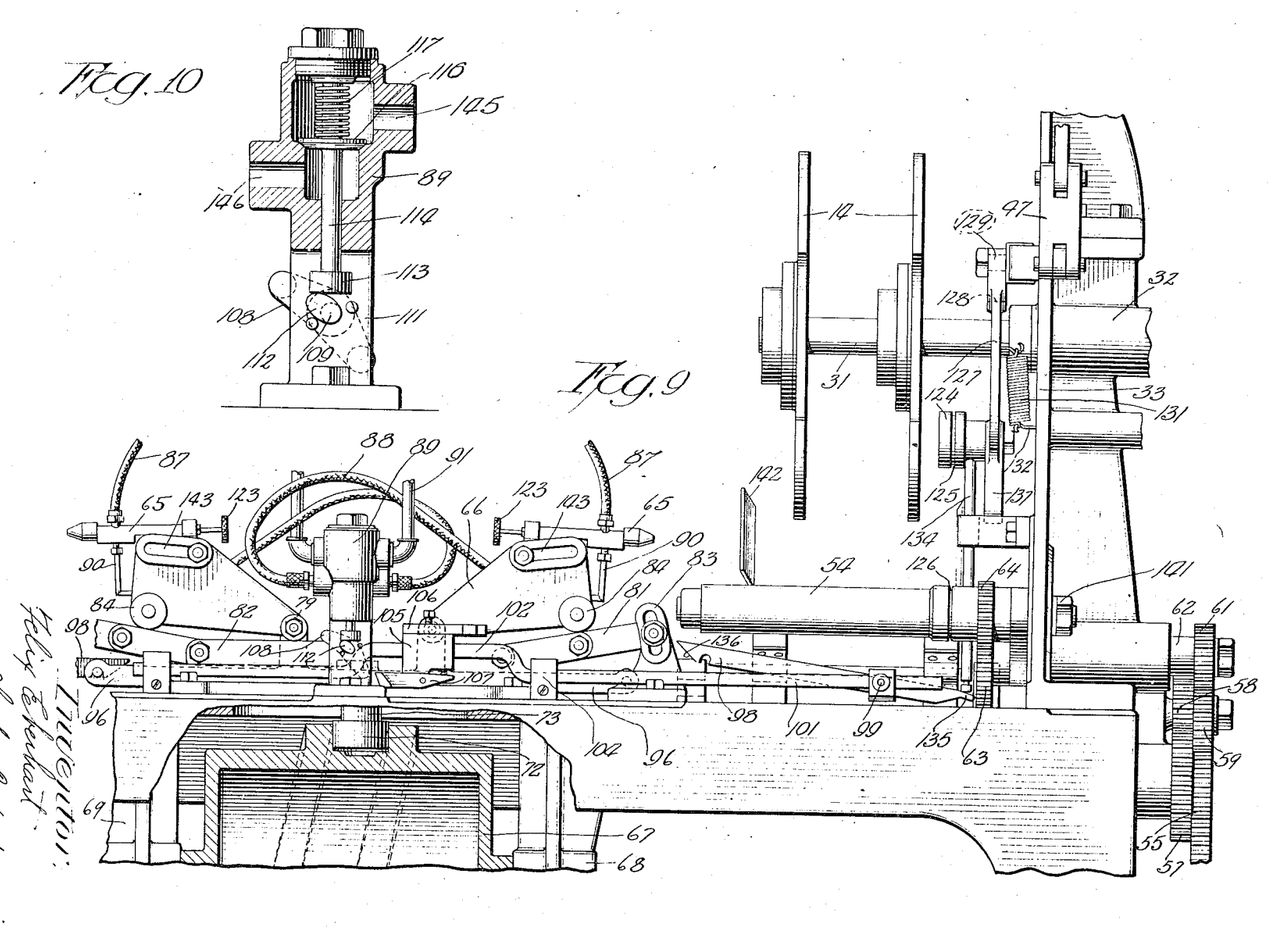
Fig. 9 is an enlarged partial side view of the machine; partly in elevation and partly in section.
Fig. 10 is a detail sectional view of the spray controlling valve.

The spraying devices, as has been heretofore stated, are duplicated in the present machine, and are arranged in such manner that they operate alternately. These devices comprise nozzles 65 which are adjustably mounted in carriages 66 which have reciprocating movement to successively dispose the nozzles at different angles with respect to the cans in order to insure the spray being directed upon all portions of the interior of the can. The reciprocating mechanism for the carriages 66 comprises a large cam member 67 which is mounted on the shaft 18 between bearings 68 and 69 depending from the bed of the frame. In the cam member 67 is a spiral groove 71 (Figs. 11 and 12) in which rides a roller 72 carried on a stud 73 extending up through a slot 74 in a bed plate 75 and through an aperture 76 in a sliding member 77 (Fig. 8), a nut 78 serving to lock this member in place. The carriages 66 are pivotally secured at one end in projections 79 on the upper side of the slide 77 and are arranged to travel on a track having inclined outer ends 81 and horizontal portions 82, the outer parts 81 of this track consisting of connected links, the outer one of which is adjustable in slotted brackets 83. It will be observed that the nozzles 65 are so mounted in the carriages 66 that when the latter are in their outer position with their rollers 84 on the inclined track portion 81 said nozzles are in horizontal position, and when the carriages are retracted so that the rollers 84 rest upon the horizontal portion 82 of the track, said nozzles are inclined downwardly as indicated at the left in Fig. 1, the downward movement being a sweeping one and inscribing an arc which insures the spray being directed to every part of the interior of the can.

The nozzles 65 are connected with a liquid tank 85 mounted upon a support 86 and having flexible tubing connections 87 with the nozzles 65. The nozzles are also connected by means of tubes 88 and pipes 90, with air valves 89, these valves being supplied with air under pressure through pipe connections 91.

The mechanism for reciprocating the carriage 66 has associated therewith valve operating mechanism to be now described. The slide 77, which has cut away portions 92 and 93 riding under projections 94 on fixed guiding members 95, is provided at its end with arms 96 from the ends of which extend pins 97. In order to connect the valve operating mechanism with the slide 77 there is provided a hook 98 to which is attached at 99 a square rod 101 which has a raised part 102 and slides through recesses 103 in bearing parts 104 in the fixed guide member 95. The hook 98 normally engages the pins 97 thereby connecting the rod 101 with the slide 77, causing said parts to be reciprocated in unison. Secured to the raised part 102 of the rod 101 is a block 105 to which are attached adjustable dogs 106 and 107 which operate the valve actuating member to be now described.

Figure 6:
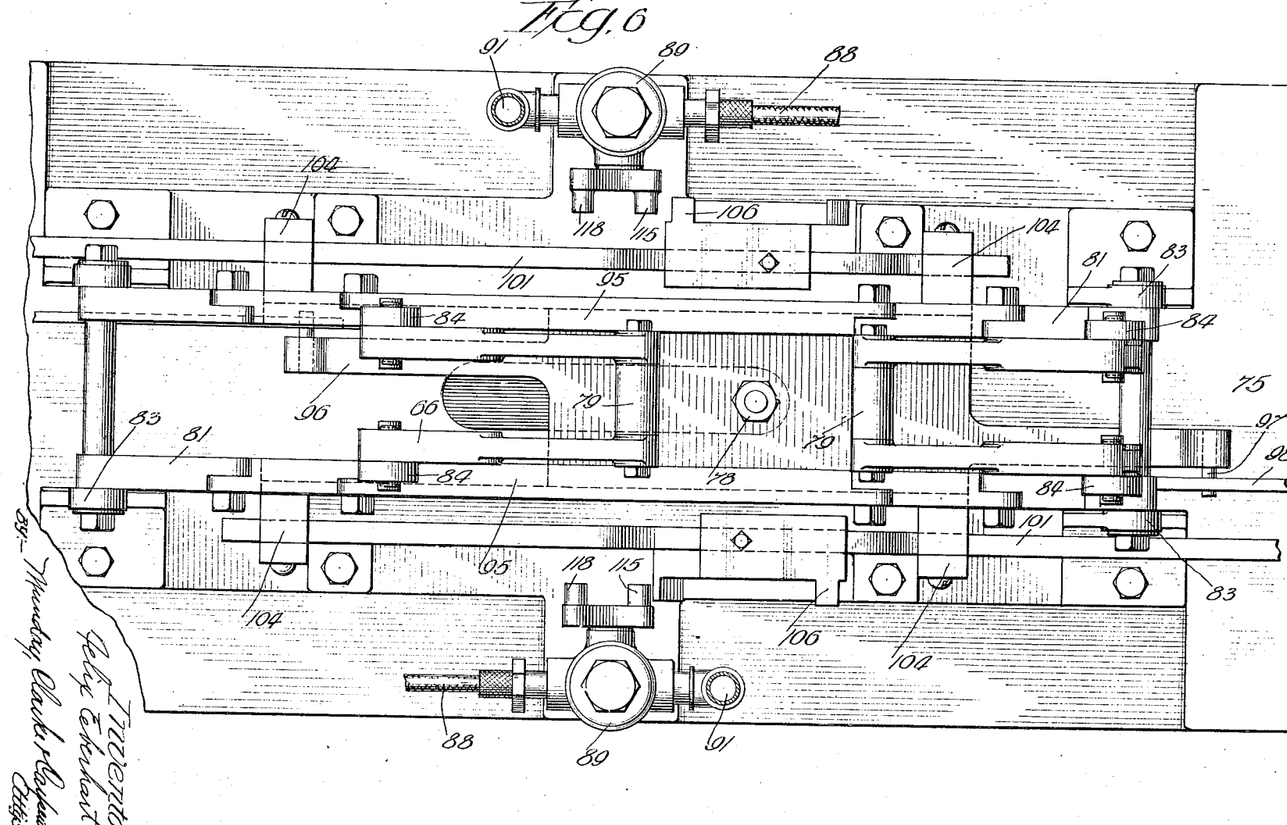
Fig. 6 is an enlarged plan view of a portion of the bed of the machine, showing certain of the operating parts.
Figure 7:
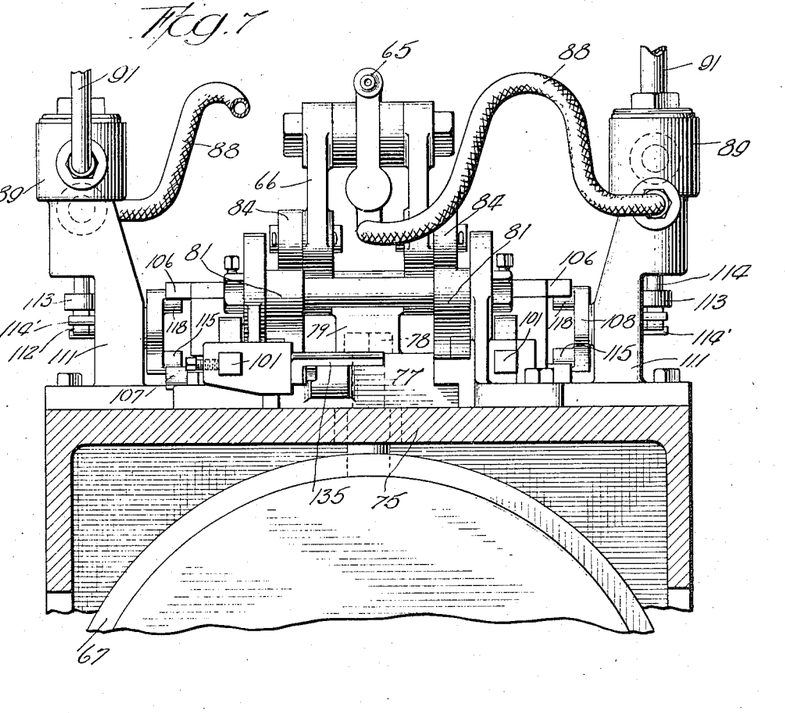
Fig. 7 is an enlarged cross sectional view taken substantially on the line 7—7 in Fig. 1.
Figure 11:
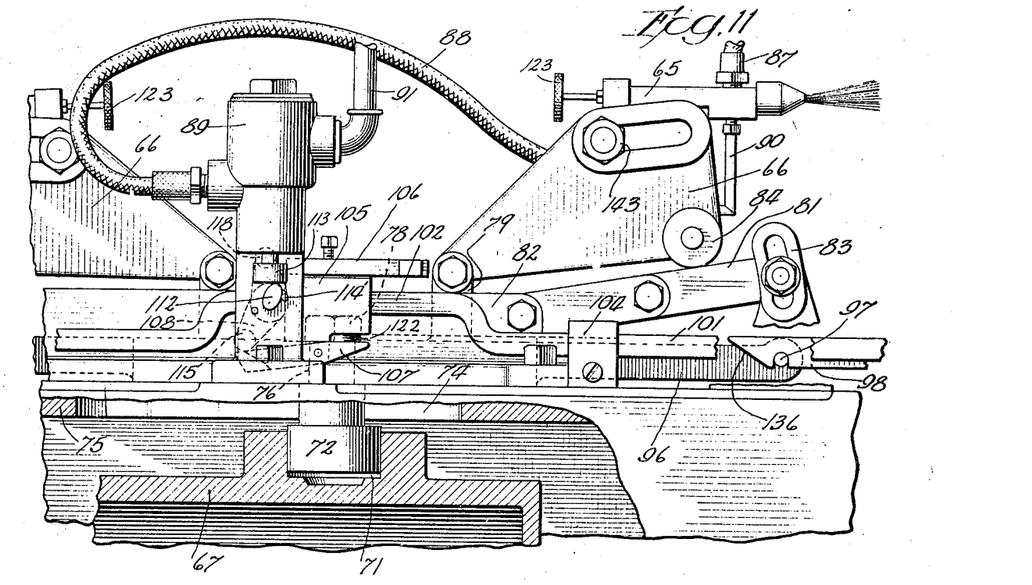
Fig. 11 is an enlarged detail view showing the valve controlling mechanism with the nozzle in spraying position.
Figure 12:
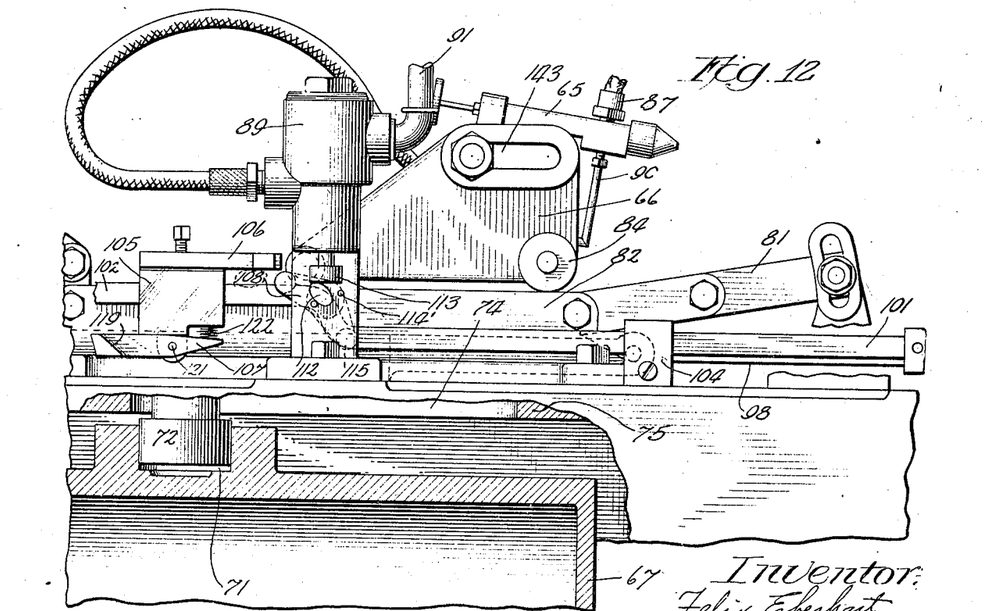
Fig. 12 is a similar view showing the nozzle carriage in horizontal position, and the valve controlling mechanism in its position immediately after operation of the valve.
Figure 13:
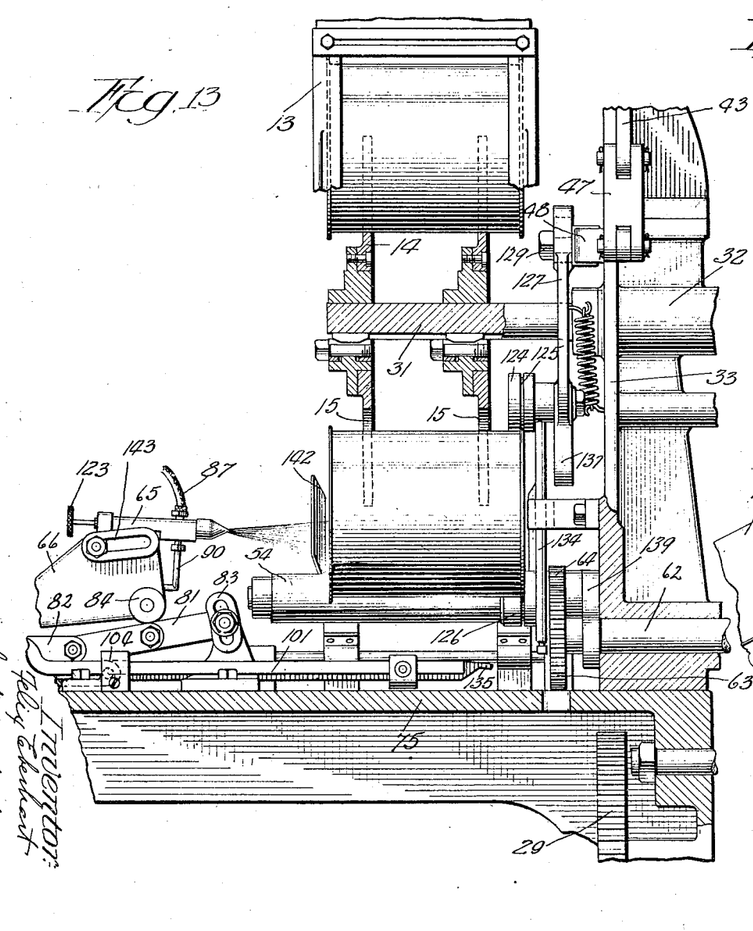
Fig. 13 is an enlarged view of the can feeding and rotating mechanism, and showing the nozzle in spraying position.

An arm 108 is pivoted at 109 on the inner side of each valve supporting part 111, and secured to the pin upon which this arm is mounted is an eccentric member 112 adapted to operate against the lower end 113 of a valve stem 114, stops 114' being provided to limit the movement of said eccentric member. Upon movement of the slide in forward direction, i. e., toward the left in Figs. 11 and 12, the lower dog 107 first strikes a lower projection 115 upon the arm 108, rocking said arm and causing the eccentric 112 to force the valve head 116 upwardly against the pressure of a spring 117, opening communication between the air pipes 91 and the nozzles 65, the valve members 89 being provided with intake and outlet apertures 145 and 146 into which extend the pipe and hose connections. This projects the spray from the nozzle, as indicated in Fig. 11, and it remains in action only until the dog 106, which is positioned a desired distance behind the dog 107, strikes an upper projection 118 upon the arm 108, rocking said arm in the opposite direction and causing the eccentric 112 to be turned to the position indicated in Fig. 12, allowing the spring 117 to close the valve. Upon the return stroke the dog 106 passes over the rocker arm 108 and the lower dog 107 slides under the projection 115, being cut away for this purpose and provided with a beveled portion 119 which, upon contact with the projection 115, rocks the dog upon its pivot 121 against the pressure of a spring 122. By referring to Figs. 6 and 7 it will be noted that the foregoing description applies to only one of said alternately functioning air valves 89, namely, the one shown in the foreground of Fig. 6. Referring now to the one shown in the background of Fig. 6 it will be noted that the position of the dogs 106 and 107 is just the reverse of those of the other set and they are constructed so as to clear the projections 115 and 118 of the rock-lever 108 on the forward stroke (i. e. movement to the left) of the slide 77, thereby leaving the valve head 116 unaffected. On the backward stroke or movement to the right, however, when the other set of dogs are idle, the dog 107 engages the projection 115, causing the eccentric 112 to lift the lower end 113 of the valve stem 114, lifting the valve member 116, thereby projecting the spray from the nozzle. Further backward movement causes the dog 106 to close the valve and to stop the spray in the same manner as the dog of the set first described. It will thus be clearly seen that on the forward stroke of the slide member one of the spraying sets is active and the other is idle and that on the return or backward stroke of the slide the second of said sets is active and the first idle, the two sets, therefore, functioning alternately. It will be understood that this return stroke is accompanied by the rolling of the carriages 66 upon their tracks, and the various parts are so adjusted that the spraying action occurs both when the carriage is upon the inclined plane 81 and when it is in its horizontal position. It will, therefore, be evident that when the nozzle is in its horizontal position the spray will be directed onto the bottom of the can, and as it is inclined downwardly the spray is directed onto the side walls and, due to the rotation of the cans on the rollers 54, the entire inner surface is sprayed. A needle valve or other controlling mechanism is provided in the nozzles 65 and controlled by a manually operable controlling member 123.

Figure 14:
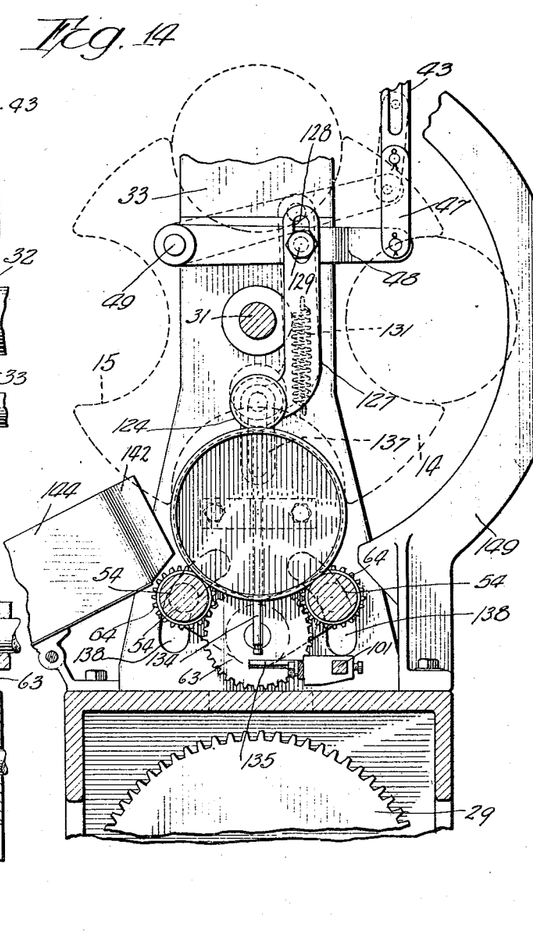
Fig. 14 is a view, partially in section, looking from the left in Fig. 13.

In order to hold the cans in position and to prevent spraying action when no can is upon the rollers 54, there is provided a third roller 124 which is provided with a groove 125 corresponding to grooves 126 in the rollers 54 for receiving the interfolded can end and body flanges at the bottom end of the can. This roller is carried in an arm 127 which has in its upper end a slot 128 through which extends a bolt 129. Attached to this arm is a spring 131 which at its lower end is attached to a hook 132 on the fixed frame and tends to pull the arm 127 downwardly when no can is in position to engage the roller 124. The bolt 129 protrudes from the arm 48 which connects with the cam slide 43 and which is elevated, as indicated in dotted lines in Fig. 14, when said slide moves upwardly. This moves the bolt 129 to the top of the slot 128 and lifts the arm 127 to permit the positioning of a can. Extending downwardly from the shank of the roller 124 is a rod 134, the lower end of which bears against the tail 135 of the hook 98 and said rod is permitted to drop by gravity in the absence of a can in spraying position. This disengages the hook from the pins 97 and prevents operation of the valve operating mechanism. When the rod 134 is raised by a can in position, the hook 98 engages the pin 97 when the latter is forced thereunder against a beveled face 136. The next reciprocation then operates the valve and it will be thus apparent that an automatic control is provided to prevent spraying in the absence of a can upon the rollers. The roller 124 is adjustable in a slotted projection 137 of the arm 127, and it will be observed also that the rollers 54 are adjustable in slots 138 in the side frame, being carried on swinging arms 139 and adapted to be set by means of nuts 141. This permits adjustment to accommodate cans of different diameter.

Guards 142 are provided near the forward end position of the cans, and it will be understood that the nozzles 65 may be adjusted with respect to the mouth of the can in slots 143 provided in the carriages 66.

After the spraying action the sprayed can is removed from the roller 54 by the next quarter turn of the turret 14 and directed by chutes 144 into a suitable receptacle.

The entire apparatus is adjustable to accommodate cans of different size, it being noted that the guideways 12 and 13 are adjustably secured in position by bolts 147 extending through slots 148. Arcuate brackets 149 are provided adjacent to the turrets 14 and serve as outer guides for the cans as they are being carried to the rollers 54.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A can spraying machine, comprising means for individually positioning and rotating can bodies, and automatically acting spraying means, comprising a carriage and a nozzle mounted thereon, and means for moving said carriage on an inclined plane to dispose the nozzle at different angles with respect to the horizontal, whereby to direct the spray to different portions of the can.

2. A can spraying machine, comprising intermittently moving means for positioning open-end cans in spray receiving position, means for rotating said cans in said position, reciprocatory spraying means having a plurality of operative positions successively directing the spray from different angles into the rotating can, and devices for reciprocating said spraying means, and changing the angle of the same, relative to the rotating can.

3. A can spraying machine comprising, in combination, means for carrying the cans in vertical planes, means for rotating the cans individually on substantially horizontal axes when they are opposite to the spraying devices directed on lines near the axis of the can being sprayed, duplicated spraying devices, and common controlling members for operating said devices at different times.

4. A can spraying machine having, in combination, means for carrying the cans in vertical planes, means for rotating the cans individually, alternating acting spraying devices directed on lines near the axis of the can being sprayed, and common controlling members for operating the spraying devices and directing them at changing inclinations.

5. A can spraying machine, comprising means for intermittently positioning cans to be sprayed, spraying devices having relative movement and a plurality of operative positions with respect to said cans, sliding means for controlling the position of said devices, spray controlling devices operatively connected with said sliding means, and means automatically operable in the absence of a can in spray receiving position for disconnecting said spray controlling means from said sliding means.

6. A can spraying machine, comprising mechanism for feeding and rotating cans in spray receiving position, spraying devices having a reciprocatory movement upon an inclined plane for directing the spray at different angles to the can, an air valve for controlling the spraying action of said devices, and means movable with said devices for controlling said valve to project the spray from different positions of the spraying devices, said means comprising a plurality of dogs disposed one in advance of the other and successively serving to open and close the valve.

7. A can spraying machine, comprising mechanism for feeding and rotating cans in spray receiving position, spraying devices having a reciprocatory movement upon an inclined plane for directing the spray at different angles to the can, an air valve for controlling the spraying action of said devices, and means movable with said devices for controlling said valve to project the spray from different positions of the spraying devices, said means comprising a plurality of dogs disposed one in advance of the other and successively serving to open and close the valve, said dogs being both operative upon the stroke of said movable members in one direction and inoperative upon the return stroke thereof.

8. A can spraying machine, comprising a plurality of successively timed spraying devices, including nozzles, each of said nozzles being mounted to assume different levels and different angles in respect to a can to be sprayed, thereby insuring a complete coating of said can.

9. In a can-spraying machine the combination of a descending can guide, a vertically arranged turret having pockets to receive and convey the cans from said guides, means for turning said turret, a roller under said turret whereon the exteriors of the cans may rest, means for turning said roller to rotate the cans, a spraying nozzle opposite to the lower part of said turret, and means for inclining the nozzle upward and downward relative to a can in said turret.

10. A machine for spraying the interior surfaces of cans having in combination, means for carrying the cans successively past a spraying station, a spraying device at said station, means for changing the angle of the spraying device relative to the inner wall surface of the can, and means for moving the spraying device towards and from the open end of the can which is being sprayed.

FELIX EBERHART.